Patented Feb. 5, 1952

2,584,349

UNITED STATES PATENT OFFICE 2,584,349

COLOR FORMING DEVELOPMENT WITH AN AROMATIC PRIMARY AMINO DEVELOPER AND α - [4 - SULFOPHENYLAZO] - ACETO- ACET-2-4-DICHLOROANILIDE

Newton Heimbach, Binghamton, N. Y., assignor to General Aniline & Film Corporation, New York, N. Y., a corporation of Delaware No Drawing. Application November 10, 1944, Serial No. 562,909

2 Claims. (Cl. 95—88)

This invention relates to the production of colored photographic images by color-forming development and more particularly to azo substituted coupling compounds as new color-forming couplers therefor.

It is known that compounds containing coupling groups activated by other substituents in the molecule such as carbonyl (=CO), nitrile (—CN), ethenol

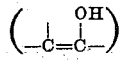

imino (=N—), etc., will react with primary aromatic amines in the presence of oxidizing agents to form dyestuffs. This reaction is the basis of color development in photographic subtractive color processes in which the primary aromatic amine developing agent becomes oxidized locally during the formation of the silver image and couples with a compound containing a reactive methylene or a phenolic hydroxyl group to form a colored dye image in situ with the developed silver image. This process is commonly called color-forming development and the compounds containing suitable color-forming groups are referred to as color-forming compounds, color-formers, or coupling components.

It is an object of the present invention to provide a new class of color-forming compounds applicable in subtractive color photography.

Another object is to provide color-forming developers containing a new class of color-formers.

Further objects will become apparent from the detailed description following hereinafter.

This invention is based on the discovery that color-formers containing an azo substituent in the reactive coupling position will react in color-forming development with the oxidation product of the developer in the usual manner to form colored images. It has been found that the azo group of the color-former is displaced by the arylamino group during dye image formation. This discovery is surprising and wholly unexpected since, in general, azo linkages are not readily displaced by other groups.

The azo substituted color-forming compounds of the present invention are represented by the following formula:

R₁—N=N—R₂ wherein R₁ is an aryl group, e. g., phenyl, naphthyl, diphenyl, and the like, and R₂ is an organic substituent containing a color-forming group, e. g., active methylene or hydroxy-divinyl, attached directly to the azo group. A color-forming active methylene group commonly constitutes a CH₂ group activated by neighboring groups, as for example:

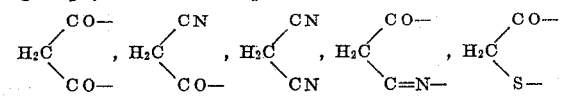

and the like. By "hydroxy-divinyl" group is meant the group

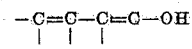

present in phenolic couplers which are reactive in the ortho or para position with respect to the position of the hydroxyl group. The above typical active methylene and hydroxy-divinyl groups which may be present in the R₂ substituent with their direct linkage to the azo group in the above general formula may be represented as:

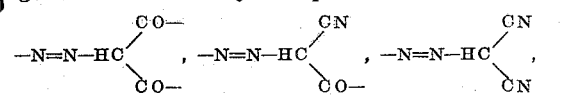

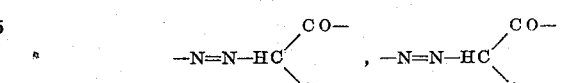

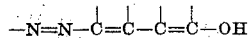

and the like. More specifically, the R₂ substituent, containing an active color-forming group, may be aliphatic, aromatic, or heterocyclic in accordance with the commonly known color couplers so long as the proper azo linkage as described above is contained therein. The R₁ and R₂ groups may contain a variety of other conventional substituents such as halogen, e. g., chlorine, bromine or iodine, alkyl, e. g., methyl ethyl propyl and the like, alkoxy, e. g., methoxy, ethoxy, etc., amino, nitro, hydroxy, acid groups, e. g., H₂O₃As—, carboxylic or sulfonic acid, or any other conventional group which will not interfere with the coupling activity of the azo substituted color-forming compounds.

In order that the nature of the invention may become apparent, the following are representative azo substituted compounds which fall within the scope thereof.

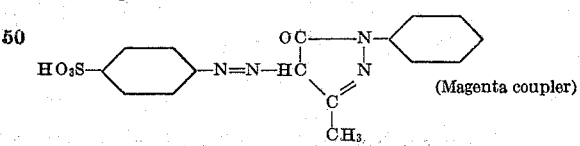

(Magenta coupler)

4-[4-sulfophenylazo]-1-phenyl-3-methyl-5-pyrazolone 2,584,349

3

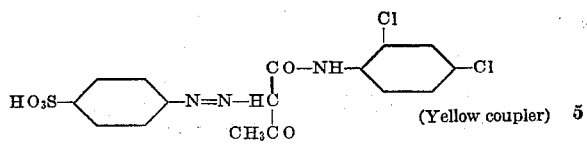

α-[4-sulfophenylazo]-acetoacet-2,4-dichloroanilide (Yellow coupler)

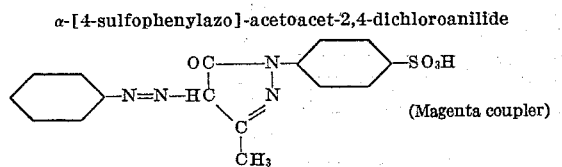

4-phenylazo-1-[4-sulfophenyl]-3-methyl-5-pyrazolone (Magenta coupler)

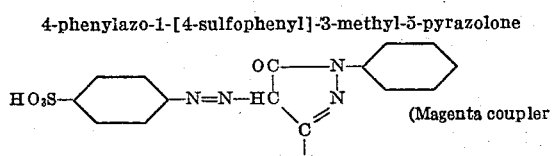

4[4-sulfophenylazo]-1-phenyl-3-amino-5-pyrazolone (Magenta coupler)

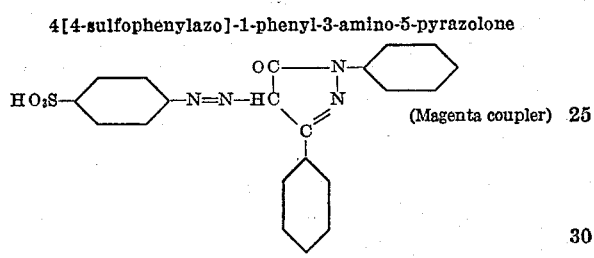

4[4-sulfophenylazo]-1,3-diphenyl-5-pyrazolone (Magenta coupler)

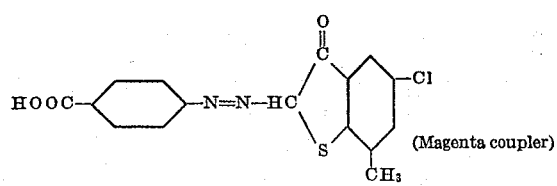

2-[4-carboxyphenylazo]-3-oxy-5-chloro-7-methylthionaphthene (Magenta coupler)

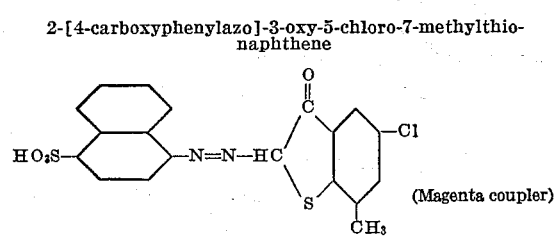

2-[4-sulfonaphthalene-1-azo]-3-oxy-5-chloro-7-methylthionaphthene (Magenta coupler)

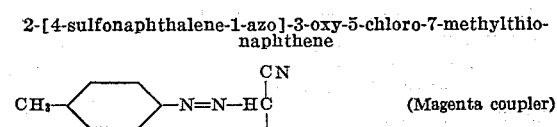

p-Tolylazo-malononitrile (Magenta coupler)

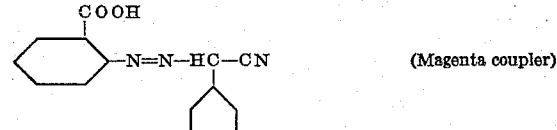

α-[2-carboxyphenylazo]-p-nitrobenzylcyanide (Magenta coupler)

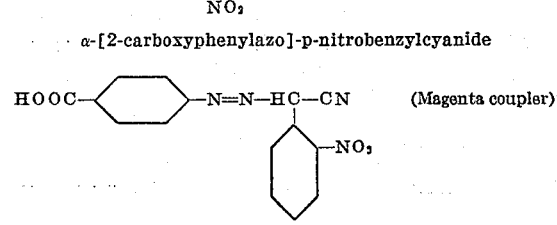

α-[4-carboxyphenylazo]-o-nitrobenzylcyanide (Magenta coupler)

4

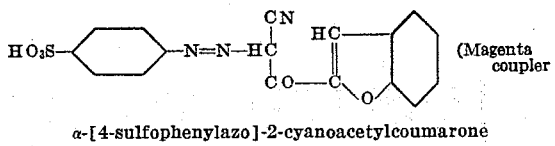

α-[4-sulfophenylazo]-2-cyanoacetylcoumarone (Magenta coupler)

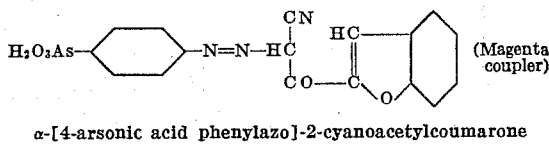

α-[4-arsonic acid phenylazo]-2-cyanoacetylcoumarone (Magenta coupler)

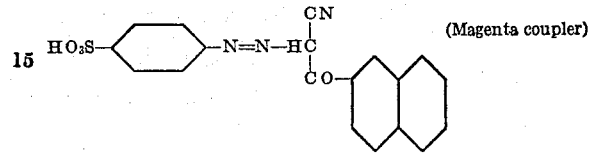

α-[4-sulfophenylazo]-2-cyanoacetylnaphthalene (Magenta coupler)

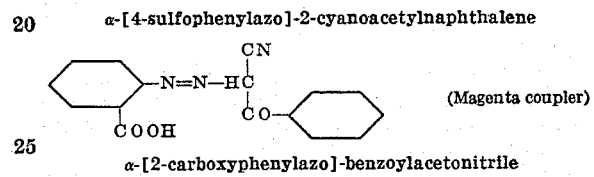

α-[2-carboxyphenylazo]-benzoylacetonitrile (Magenta coupler)

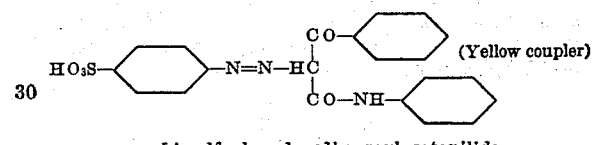

α-[4-sulfophenylazo]benzoylacetanilide (Yellow coupler)

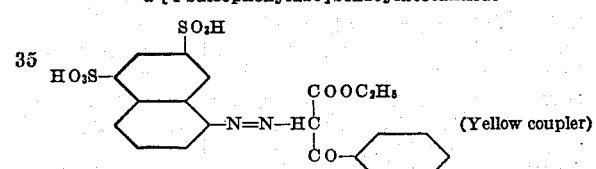

α-[5,7-disulfonaphthalene-1-azo]ethylbenzoylacetate (Yellow coupler)

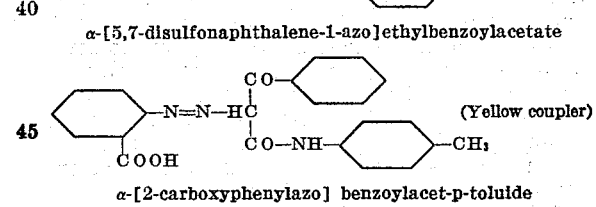

α-[2-carboxyphenylazo] benzoylacet-p-toluide (Yellow coupler)

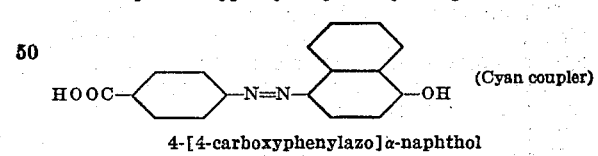

4-[4-carboxyphenylazo]α-naphthol (Cyan coupler)

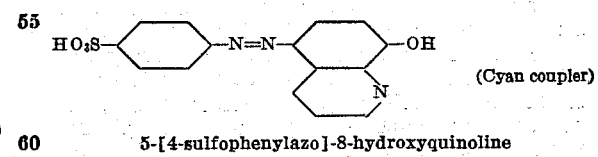

5-[4-sulfophenylazo]-8-hydroxyquinoline (Cyan coupler)

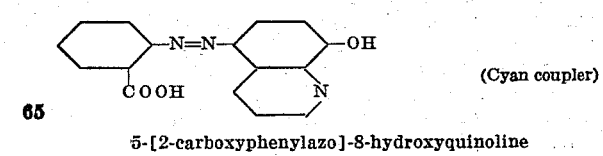

5-[2-carboxyphenylazo]-8-hydroxyquinoline (Cyan coupler)

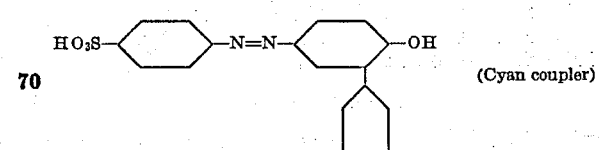

4-[4-sulfophenylazo]-2-phenylphenol (Cyan coupler)

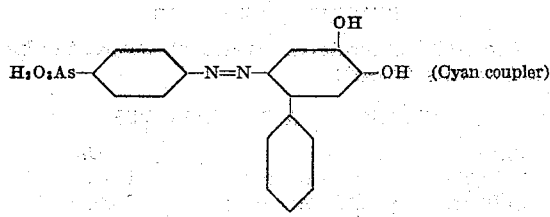

2-[4-arsonic acid phenylazo]-4,5-dihydroxydiphenyl

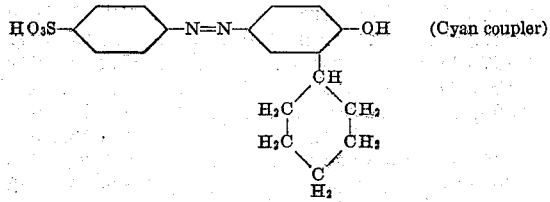

4-[4-sulfophenylazo]-2-cyclohexylphenol

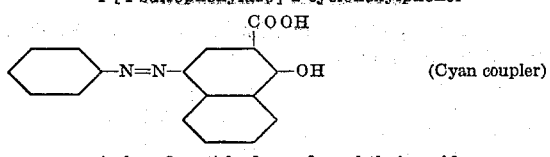

4-phenylazo-1-hydroxy-2-naphthoic acid

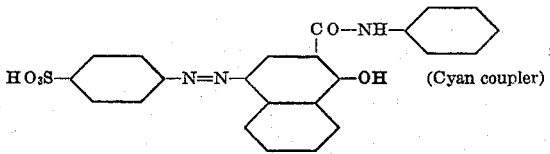

4-[4-sulfophenylazo]-1-hydroxy-2-naphthanilide

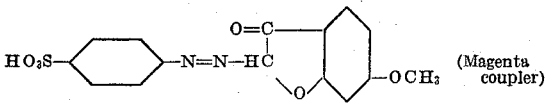

2-[4-sulfophenylazo]-6-methoxycoumarone

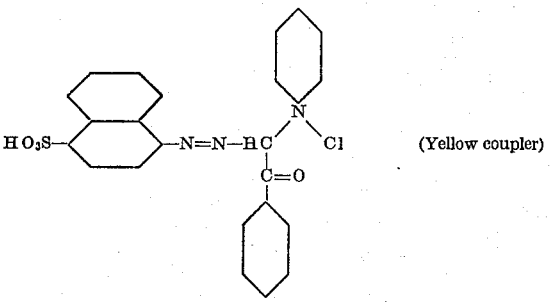

α-[4-sulfonaphthalene-1-azo]-benzoylmethylpyridinium-
chloride

The above compounds are readily prepared in good yield by methods well-known to the art and need not be described here.

The aromatic primary amines used with the azo substituted coupler compounds of this invention include p-phenylene diamine, mono ethyl-p-phenylene diamine, di-ethyl-o-phenylene diamine, 4,4'-diamine-diphenylamine, p-amino dialkyl anilines, e. g., p-amino dimethyl aniline and p-amino-diethyl aniline. These compounds are preferably used in the form of their salts such as the hydrochloride or sulfate, since they are more soluble and stable than the free base. The p-amino phenols and their substitution products may also be used where the amino group is unsubstituted. All of these compounds are characterized by the presence of a primary amino group in the phenyl nucleus which enables its oxidation product in the developer to couple with the azo substituted color-former to form a dye image in the emulsion adjacent to the individual particles of the silver image. The silver image may be removed by bleaching in the well-known manner to leave the color image in the emulsion.

The following example is illustrative of a suitable developing solution to which the color-formers may be added either as such or in the form of a solution in a suitable solvent, such as water, ethyl alcohol, acetone and the like, or they may be dissolved in dilute sodium carbonate, sodium or potassium hydroxide solution etc., and added to the developer just prior to color development.

| | | |
|---|---|---|
| p-Amino-diethylaniline HCl | grams | 2.0 |
| Sodium carbonate (anhydrous) | do | 50.0 |
| Sodium sulfite (anhydrous) | do | 2.0 |
| Potassium bromide | do | 0.2 |
| Water to make | liter | 1 |

Many specific objects, features and advantages of this invention will become apparent to those skilled in the art from the specific examples appearing below. The following examples are not to be considered as limiting the invention, but are merely illustrative of methods of carrying it out.

*Example I*

One gram of α-[4-sulfophenylazo]-acetoacet-2,4-dichloroanilide was dissolved in 25 cc. of 5% sodium carbonate solution. This solution was then added to the developing solution and used for the development of an exposed silver-halide emulsion. A yellow image was obtained together with the silver image.

*Example II*

One gram of α-[4-arsonic acid phenylazo]-2-cyanoacetylcoumarone was dissolved in 25 cc. of 5% sodium carbonate solution. This solution was then added to the developing solution and used for the development of an exposed silver-halide emulsion. A magenta image was obtained together with the silver image.

*Example III*

One gram of 4-[4-sulfophenylazo]-1-phenyl-3-methyl-5-pyrazolone was dissolved in 25 cc. of 5% sodium carbonate solution. This solution was then added to the developing solution and used for the development of an exposed silver-halide emulsion. A magenta image was obtained together with the silver image.

*Example IV*

One gram of α-[2-carboxyphenylazo]-p-nitrobenzylcyanide was dissolved in 25 cc. of 5% sodium carbonate solution. This solution was then added to the developing solution and used for the development of an exposed silver-halide emulsion. A magenta image was obtained together with the silver image.

*Example V*

One gram of 4-[4-carboxyphenylazo]-α-naphthol was dissolved in 25 cc. of 5% sodium carbonate solution. This solution was then added to the developing solution and used for the development of an exposed silver-halide emulsion. A cyan image was obtained together with the silver image.

*Example VI*

One gram of 4-[4-sulfophenylazo] - 2 - phenylphenol was dissolved in 25 cc. of 5% sodium carbonate solution. This solution was then added to the developing solution and used for the development of an exposed silver-halide emulsion. A cyan image was obtained together with the silver image.

While I have disclosed the preferred embodiments of my invention and the preferred modes of carrying the same into effect, it will be readily apparent to those skilled in the art that many variations may be made therein without departing from the spirit thereof. Accordingly, the scope of my invention is to be limited by the following claims.

I claim:
1. A color-forming photographic developer comprising an aromatic primary amino developing agent and α-[4-sulfophenylazo]-acetoacet-2,4-dichloroanilide.
2. The method of producing a yellow color photographic image in a gelatino silver-halide emulsion layer which comprises exposing the layer and developing it with an aqueous solution of an aromatic primary amino developing agent containing α-[4-sulfophenylazo]-acetoacet-2,4-dichloroanilide.

NEWTON HEIMBACH.

REFERENCES CITED

The following references are of record in the file of this patent:

UNITED STATES PATENTS

| Number | Name | Date |
|---|---|---|
| 2,179,238 | Wilmanns et al. | Nov. 7, 1939 |
| 2,179,239 | Wilmanns et al. | Nov. 7, 1939 |
| 2,186,849 | Wilmanns et al. | Jan. 9, 1940 |
| 2,213,986 | Kendall et al. | Sept. 10, 1940 |
| 2,220,123 | Schwarc | Nov. 5, 1940 |
| 2,271,230 | Peterson et al. | Jan. 27, 1942 |
| 2,297,732 | Woodward | Oct. 6, 1942 |
| 2,304,820 | Hanford et al. | Dec. 15, 1942 |
| 2,308,023 | Peterson | Jan. 23, 1943 |
| 2,434,272 | Jelley | Jan. 13, 1948 |
| 2,449,966 | Hanson | Sept. 21, 1948 |
| 2,453,661 | Glass | Nov. 9, 1948 |

OTHER REFERENCES

Ser. No. 394,290, Bruylants et al. (A. P. C.), published May 4, 1943.